United States Patent
Van De Streek et al.

(10) Patent No.: US 7,096,427 B2
(45) Date of Patent: Aug. 22, 2006

(54) METHOD AND SYSTEM FOR SELECTING A POSITION IN AN IMAGE SEQUENCE

(75) Inventors: Eibert Van De Streek, Eindhoven (NL); Jan Benjamin Te Kiefte, Eindhoven (NL); Duco Annardo David Das, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 519 days.

(21) Appl. No.: 10/122,797

(22) Filed: Apr. 12, 2002

(65) Prior Publication Data

US 2002/0186234 A1 Dec. 12, 2002

(30) Foreign Application Priority Data

Apr. 17, 2001 (EP) .................................. 01201399

(51) Int. Cl.
*G06F 3/00* (2006.01)
*G06G 5/00* (2006.01)
(52) U.S. Cl. ...................... 715/719; 715/716; 715/715; 715/723
(58) Field of Classification Search ................ 715/716, 715/719, 720, 721, 723, 835, 838, 786, 833, 715/500.1, 512, 500; 386/52, 55, 65
See application file for complete search history.

(56) References Cited

U.S. PATENT DOCUMENTS

| | | | |
|---|---|---|---|
| 5,884,056 A * | 3/1999 | Steele | 715/738 |
| 5,920,317 A * | 7/1999 | McDonald | 715/853 |
| 6,317,141 B1 * | 11/2001 | Pavley et al. | 715/732 |
| 6,602,297 B1 * | 8/2003 | Song | 715/500.1 |
| 6,711,741 B1 * | 3/2004 | Yeo | 725/87 |
| 6,757,906 B1 * | 6/2004 | Look et al. | 725/45 |

FOREIGN PATENT DOCUMENTS

EP 0782085 A1 12/1996

OTHER PUBLICATIONS

Frederic Dufaux, Key frame selection to represent a video, Sep. 10-13, 2000, IEEE, vol. 2, pp. 275-278.*

* cited by examiner

*Primary Examiner*—Kieu D. Vu
(74) *Attorney, Agent, or Firm*—Michael E. Belk

(57) ABSTRACT

Method of and system for selecting a position in an image sequence. A representation (200) of the image sequence is displayed, together with a position indicator (206) configured to be moved along the representation (200). The position in the image sequence is selected in correspondence to a present position of the position indicator (206). A collection of key frames is obtained, each key frame being associated with a portion of the representation (200). From this collection of key frames a current key frame (212) is displayed whose associated portion comprises a present position of the position indicator (206). Indications (205) of the locations of the key frames in the collection may be shown as well.

20 Claims, 2 Drawing Sheets

METHOD AND SYSTEM FOR SELECTING A POSITION IN AN IMAGE SEQUENCE

Figure 1:
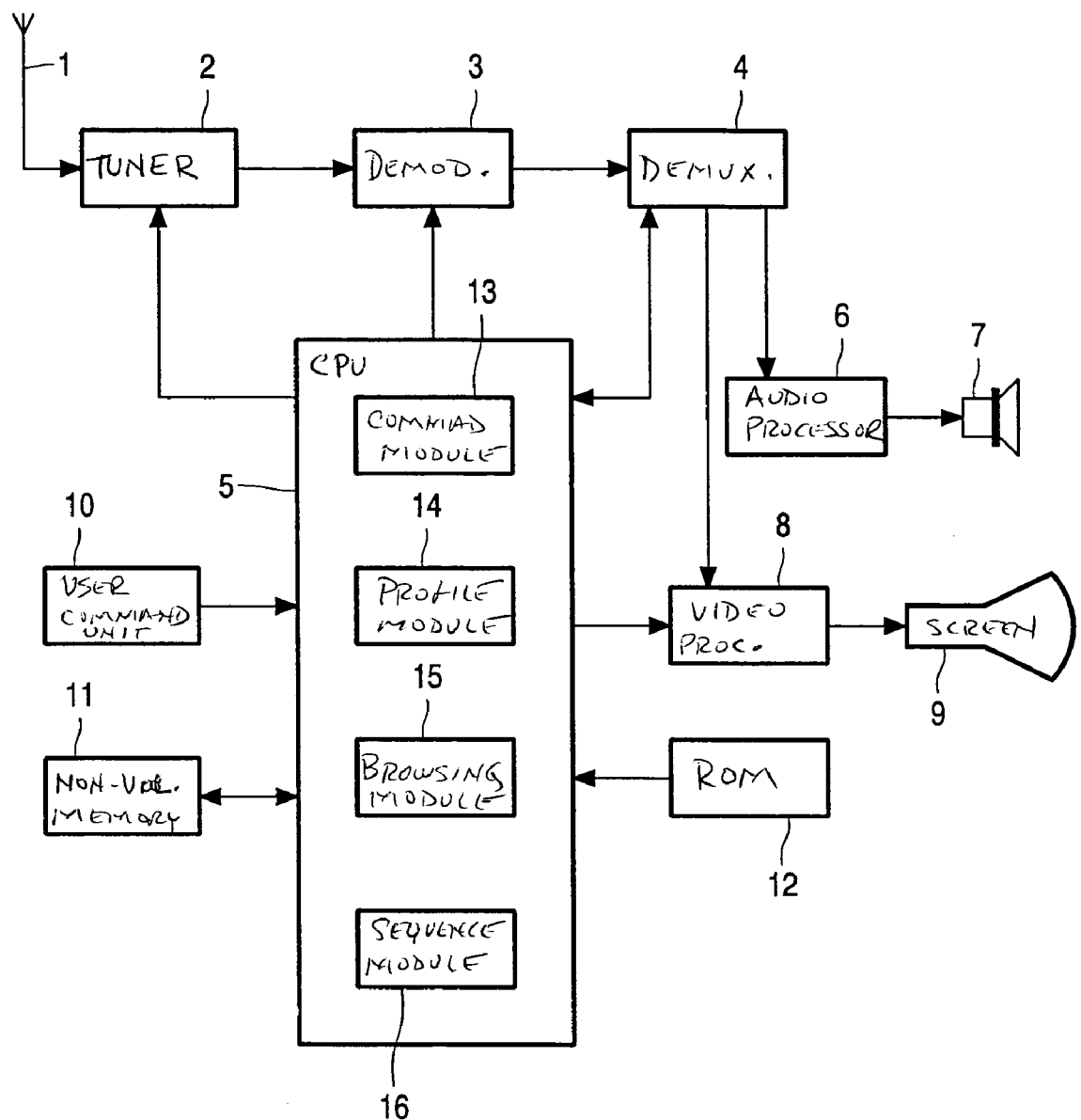

The invention relates to a method of selecting a position in an image sequence, comprising displaying a representation of the image sequence, providing a position indicator configured to be moved along the representation, and selecting the position in the image sequence in correspondence to a present position of the position indicator.

The invention further relates to a system for selecting a position in an image sequence, comprising browsing means for displaying a representation of the image sequence and a position indicator configured to be moved along the representation, and selecting means for selecting the position in the image sequence in correspondence to a present position of the position indicator.

An embodiment of the method and system according to the preamble are known from U.S. Pat. No. 5,903,264. When watching an image sequence, such as a video stream, it is often desirable to be able to navigate to a specific position or viewpoint in the image sequence. This allows the viewer to skip the uninteresting parts of the sequence, or to repeat very interesting parts. Conventional video playback systems are provided to this end with fast forward and fast backward buttons, which allow the user to increase the speed in either the forward or the backward direction.

Alternatively, some video on demand systems include fast forward and fast reverse streams, referred to as trick play streams, for each movie. When the user desires to fast forward or fast reverse to a movie, he selects the fast forward or fast reverse option, and the respective fast forward or fast reverse trick play stream is then transferred to the user in the appropriate points where the user was watching, instead of the normal play stream. This way a fast forward or fast reverse version of the movie being watched is simulated.

The speed at which the movie is played back during such a fast forward or fast backwards operation may vary. Repeatedly pressing the appropriate button can be used to increase the speed. However, no matter how high the speed is, it is still necessary for the viewer to watch the video stream scroll by. The above-mentioned U.S. Patent discloses a system which displays a graphical bar on a television or display unit for jumping to different positions in a video stream. A user can position a slider along the bar to select a position in the video stream. The system then translates the position of the slider along the bar to a temporal position in the video stream, and initiates or resumes playback of the video stream at that position.

The known system has the disadvantage that the viewer can only see the frame on the video stream corresponding to the location of the slider along the bar. This makes it very difficult for him to establish the context in which this frame occurs in the video stream, and so makes it difficult for him to navigate through the video stream.

It is an object of the invention to provide a method according to the preamble, which provides the viewer with a suitable context during the selection of the position in the image sequence.

This object is achieved according to the invention in a method which is characterized by obtaining a collection of key frames, each key frame being associated with a portion of the representation, selecting from the collection of key frames a current key frame whose associated portion comprises a present position of the slider, and displaying the current key frame. Key frames are frames that are representative of a portion of the image sequence. For example, the first frame of a new scene in a video stream may serve as a key frame representative of that scene. A collection of key frames thus provides an overview of the image sequence. Each key frame is associated with a portion of the representation, since it represents that portion. Now, when the slider is moved along the representation, it moves along the portions as well. When the slider is positioned within a particular portion, the key frame associated with that portion is then displayed. This provides the user with a visual cue with regards to his context.

In an embodiment the image sequence constitutes a video stream. Selecting a position in a video stream is particularly difficult because of the average length of video streams, and so the method according to the invention is especially advantageous when the image sequence constitutes a video stream.

In a further embodiment the collection of key frames is obtained by automatically generating plural key frames from the video stream. For video streams, which are typically very large, it is difficult and cumbersome to manually generate a collection of key frames representative of the video stream. Various techniques to automatically identify and extract key frames from a video stream have been developed and are known in the art. By using such a technique to obtain the collection of key frames, the method according to the invention can be used with any video stream, even when no key frames have been identified in advance.

In a further embodiment the method further comprises displaying a further key frame from the collection, being adjacent in the sequence to the current key frame. While a single key frame does provide enough context to identify the current position, it is often desirable to provide more context. By providing at least one further key frame from the collection which is adjacent to the current key frame, more context is provided.

In a further embodiment the method further comprises displaying a next key frame from the collection of key frames, being the successor to the current key frame in the collection of key frames, a previous key frame from the collection of key frames, being the predecessor to the current key frame in the collection of key frames, a further next key frame from the collection of key frames, being the successor to the next key frame in the collection of key frames, and a further previous key frame from the collection of key frames, being the predecessor to the previous key frame in the collection of key frames. It has been found in practice that displaying five frames, including the current key frame, is especially advantageous. Five key frames can be displayed together at a sufficient resolution to be individually recognizable, yet they are usually sufficiently distant in the image sequence so as to provide a sufficient context for a relatively large portion of the image sequence.

In a further embodiment the slider is configured to be user operably positioned along the representation. When the slider is moved automatically, the user can get a quick overview of the image sequence by watching the current key frame as it changes over time. He can then indicate at some points that he wishes to resume or start play back of the image sequence. However, by giving the user control over the movement of the slider, he can quickly position the slider at a desired position. This way, he can, for example, skip to the last parts of the image sequence if he knows that a frame of interest is located somewhere around there.

In a further embodiment the method further comprises displaying an indication of at least one key frame from the collection of key frames along the representation at a location corresponding to the portion associated with the at least one key frame. Key frames are typically not distributed evenly along the representation, especially not when they are generated automatically. This means that, while the slider moves along the representation, the current key frame changes at apparently random moments. By providing a visual indication of at least one key frame along the representation, it is achieved that the user gets better feedback on the workings of the method.

In a variant of this embodiment the selection of the current key frame is made whenever the slider is moved along a location of an indication of a key frame from the collection of key frames. If the presence of a key frame is indicated visually along the representation, it is logical that the key frame is updated when the slider moves along said indication. The transition of one key frame to another then corresponds to the slider passing an indication.

In a further embodiment the method further comprises displaying, in response to a Pause action, the current key frame in a substantially full screen fashion. Key frames are typically shown at a reduced size, especially when plural key frames are shown at one time. Because of this reduced size, it may be hard for the viewer to identify details. It is therefore advantageous that he be able to view the current key frame at a substantially full screen resolution. The use of a Pause action, effected typically by the viewer pressing a pause button on a remote control, is an intuitive way to request full screen display of the key frame, since pressing the pause button conventionally results in a single frame being displayed. The display need not be completely full screen, as it may be desirable to maintain the representation and the slider on the screen as well.

It is a further object of the invention to provide a system according to the preamble, which provides the user with a suitable amount of context during the selection of the position.

This object is achieved according to the invention in a system which is characterized by sequencing means for obtaining a collection of key frames, each key frame being associated with a portion of the representation, and current key frame selecting means for selecting from the collection of key frames a current key frame whose associated portion comprises a present position of the slider, the browsing means being arranged for further displaying the current key frame. When the browsing means are activated, the representation and the slider are shown, and the slider can be positioned along the representation. The collection of key frames, which is obtained for example through automatic generation of key frames, is used to provide the user with the desired amount of context.

In an embodiment the system is arranged for upon a first occurrence of an increase speed action, displaying the image sequence at a display speed higher than the normal display speed, and upon a further occurrence of the increase speed action, activating the browsing means. Ordinarily, the viewer navigates through the image sequence by using his fast forward and fast backward buttons. Pressing one of these buttons increases the display speed with respect to the normal display speed, and so the user can browse through the image sequence. Repeatedly pressing this button may increase the speed further. Since the method and system according to the invention provide the viewer with a way of navigating through the image sequence even faster, it can be seen as the superlative of the fast forward or fast backward action. So, it is advantageous to have a further occurrence of the increase speed action activating the browsing means.

The invention further relates to a computer program product enabling a programmable device to function as a system according to the invention.

Figure 2:
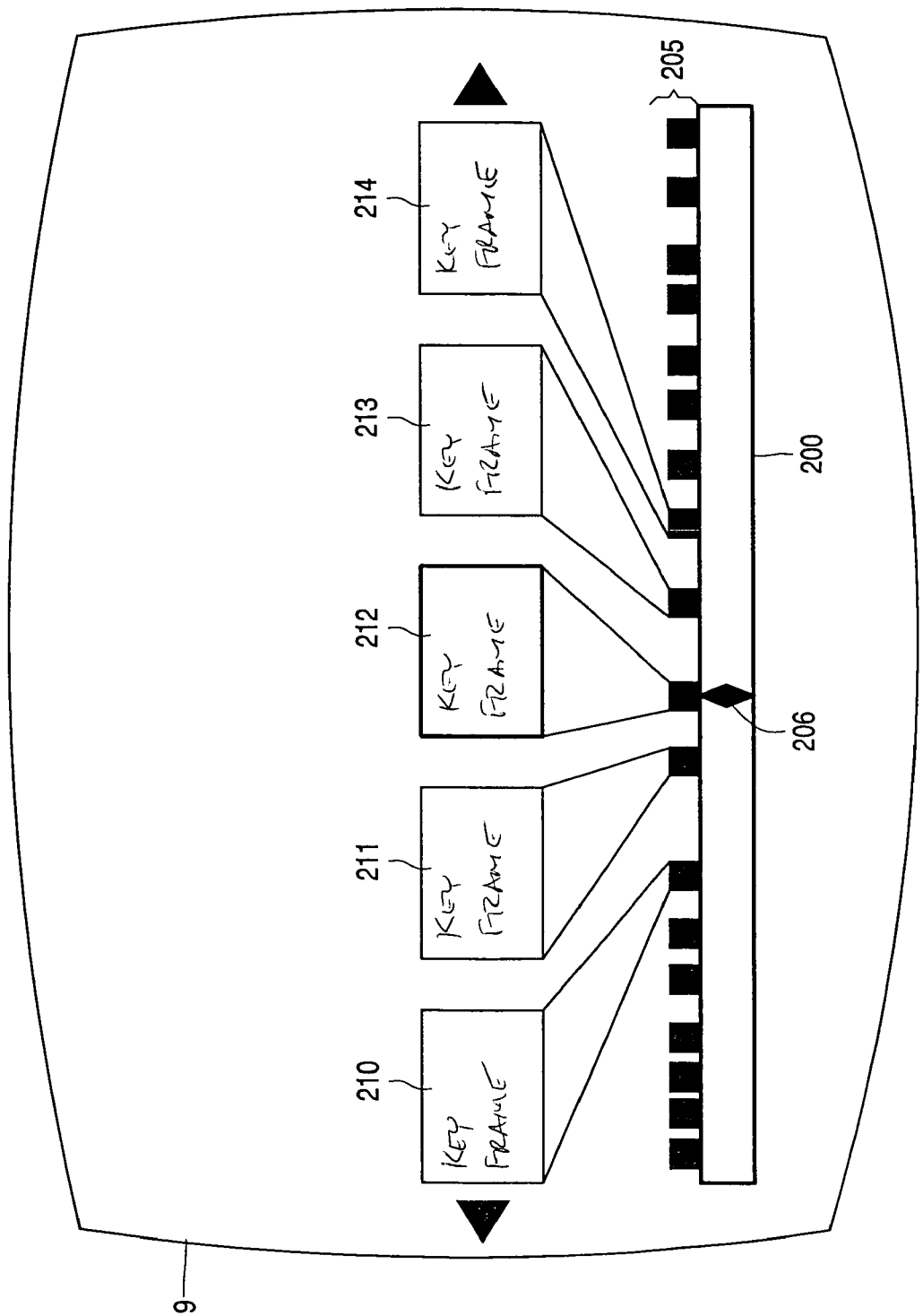

These and other aspects of the invention will be apparent from and elucidated with reference to the embodiments shown in the drawing, in which:

FIG. 1 schematically shows a television receiver comprising a system according to the invention; and FIG. 2 schematically shows the display of the television receiver during operation of the system according to the invention.

Throughout the figures, same reference numerals indicate similar or corresponding features. Some of the features indicated in the drawings are typically implemented in software, and as such represent software entities, such as software modules or objects.

FIG. 1 schematically shows a television receiver comprising a system according to the invention. Digital broadcast streams, modulated upon radio frequency (RF) signals, are received from the ether by an antenna 1, or, alternatively, from a cable network. The broadcast streams may be formatted, for example, in accordance with the Digital Video Broadcasting (DVB) standard. A tuner 2 comprises a standard analog RF receiving device which is capable of receiving said RF signals and selecting one of them to be output to a demodulator 3. Which signal the tuner 2 is depending upon control data received from a central processing unit (CPU) 5. The demodulator 3 converts the analog signal into a digital packet stream, based on the control signals received from the CPU 5. This packet stream is then output to a demultiplexer 4, which selects packets belonging to a particular program in accordance with control data received from the CPU 5, and decomposes the packet stream into elementary audio, video or data streams. While the system will be discussed below with reference to a video stream, any image sequence in general can be used as well.

In addition to broadcast signals, the television receiver may be adapted to receive signals from other sources too, for example, from a (digital) video recorder or DVD player, from the internet, or from a digital subscriber line. Programs and program attributes need not be obtained from the same source. For example, attribute and attribute values relating to broadcast programs may be obtained from an internet site.

A video processor 8 decodes the video stream received from the demultiplexer 4 or from the CPU 5. Decoded video data is then transmitted to a display screen 9. An audio processor 6 decodes the audio stream received from the demultiplexer 4. Decoded audio data is then transmitted to a speaker system 7.

The demultiplexer 4 outputs the elementary data stream to the CPU 5. The elementary data stream has two types of data: control data and content data. Content refers to, for example, interactive programs; control refers to tables in the multiplex which specify matters like the structure of the multiplex, the (RF) frequencies at which the channels are modulated, and the addresses at which the various content components and the (other) tables in the multiplex can be found. The CPU 5 comprises one or more microprocessors capable of executing program instructions stored in a read-only memory (ROM) 12. Alternatively, program instructions may be stored in a random-access memory such as a hard disk. These program instructions comprise parts of software modules including, inter alia, a command module 13, and a preference profile module 14. Data processed by said software modules, e.g. DVB-SI data and preference profile information, may be stored in a non-volatile memory 11. The command module 13 is capable of controlling functions of the television receiver, like tuning and demultiplexing a selection, and transmitting data to the video processor 8 to be presented on the screen 9.

A user command unit 10 receives user commands, e.g. through a remote control (not shown), and transmits them to the command module 13 to be processed. For example, when the user enters a channel number, the command module 13 controls the tuner 2 and the demultiplexer 4 to select the corresponding broadcast stream and data packets therein, and sends graphical data to the video processor 8 to present feedback on the screen 9, e.g. the present number, the channel name being displayed for a few seconds.

The preference profile module 14 interprets the program attributes, for example received as DVB-SI data from the demultiplexer 4 to collect information about the channels, or "services" in DVB terminology, which are available in the received broadcast streams and about the programs, or "events" in DVB terminology, which are scheduled for those channels. The preference profile module 14 may be arranged to learn from the user's viewing behavior. For example, the preference profile module 14 could receive the commands from the command module 13 and determine from that which programs the user finds interesting. The preference profile module 14 records the user's preferences and interest in a preference profile for a user. The preference profile module 14 may maintain a collection of preference profiles.

When, during normal playback of the video stream, the user presses signals to the user command unit 10 to increase the display speed in the forward or backward direction, for example by pressing a fast forward button or fast rewind button on his remote control, the command module 13 controls the video processor 8 to decode the video stream at a higher speed. Repeatedly pressing the fast forward button or fast rewind button results in the video processor 8 decoding the video stream at even higher speeds. After a number of repeated occurrences of the user pressing said button, a browsing module 15 is activated.

The browsing module 15 generates a representation of the image sequence and provides a slider configured to be moved along the representation. The representation and slider are then shown on the display 9, for instance by feeding them to the video processor 8.

A sequencing module 16 obtains a collection of key frames for the video stream. Preferably, the sequencing module 16 automatically generates plural key frames from the video stream. This will be explained in more detail below.

FIG. 2 schematically shows the display 9 during operation of the system according to the invention. A representation 200 of the video stream is displayed as a horizontal bar. The horizontal bar can be colored, or indicated in other ways. The representation 200 may be further enhanced with indications of the length of the video stream being represented, for example by displaying the total length of the video stream at the right of the bar, or by providing a time scale below the bar. This provides the viewer with an indication of the length of the video stream and allows him to quickly jump to a specific location in the video stream.

The representation 200 of course does not have to be a horizontal bar, or even a bar at all. The representation 200 could also be a vertical bar, or curved in some way. What is important is that the user is able to recognize the representation 200 as such.

A position indicator is provided, here in the form of a slider 206. The slider 206 is configured to be moved along the representation 200. In the embodiment shown in FIG. 2, the slider is superimposed upon the representation 200.

Preferably, the slider 206 is configured to be user-operably positioned along the representation 200. To this end, the user's remote control could be provided with "forward" and "backward" buttons, a four-way cursor, a jog wheel, a scroll wheel or some other input mechanism to indicate the direction in which the slider 206 is to be moved. Alternatively, the user command unit 10 may be arranged to receive input through a voice command, and the browsing module 15 is arranged to move the slider 206 along the representation 200 in response to the appropriate voice commands. If the system according to the invention is embodied on a computer system, an input device such as a mouse or cursor keys may be used to position the slider along the representation, either by selecting and dragging the slider 206 along the representation to a desired location, or by clicking on the desired location, in response to which the slider 206 is positioned there.

The present position of the slider 206 with respect to the representation 200 can be translated to a present position in the video stream. For example, if the slider 206 is positioned half way the representation 200, then this is translated to a position half way the video stream. This translation is known in the art; see e.g. the above-mentioned U.S. Patent.

Alternative to using the slider 206, any other type of position indicator can be used. For example, a portion of the representation 200 could be highlighted to indicate a present position on the representation 200. If the representation 200 is curved, it is advantageous to use a pointer or a clock hand to indicate the present position.

When a position in the video stream has been selected, play back of the video stream could be started or resumed at that point. However, it may be desirable to wait for an explicit user action indicating that play back should be started or resumed at that point. For example, if the user positions the slider 206 at a specific location along the representation 200, and then presses the play button on a remote control, the present location of the slider 206 at the moment the user presses the play button should be translated to the position in the video stream. Play back is then started or resumed on that position.

The key frames 210–214 may be displayed user-actuably. If the user then actuates one of the key frames, playback of the video stream starts at the location in the video stream represented by the location of the selected one of the key frames. This way, the user does not have to position the slider 206 exactly along the location of the desired key frame. Actuation can be achieved by providing a cursor or other on-screen pointer which can be moved by the user, e.g. by his jog wheel, scroll wheel or other input mechanism. If this pointer is moved over a key frame, optionally followed by pressing a button, playback of the video stream starts at the location in the video stream represented by the location of the selected one of the key frames. When the invention is embodied in a computer system, the conventional mouse-controlled cursor and the associated single- and double-clicking mechanisms can be used.

The sequencing module 16 obtains a temporally ordered collection of key frames for the video stream. Key frames are frames that are representatives of a portion of the image sequence. For example, the first frame of a new scene in a video stream may serve as a key frame representative of that scene. Alternatively, representative images can be created manually rather than being chosen as images from the image sequence.

For some video streams, e.g. a DVD, there is provided together with the video stream a collection of key frames for that video stream. The collection is then readily available.

However, often this will not be the case and even when this is the case, the number of key frames in such a sequence will be very limited and so will be of little use in the method according to the invention.

Therefore, preferably the sequencing module 16 automatically generates the collection of key frames by automatically detecting plural representative key frames from the video stream. By analyzing the frames that comprise the video stream, frames representing significant streams can be detected and selected. A frame that is representative of such a scene can then be identified as a key frame and added to the collection. Two suitable techniques for this purpose are disclosed in International Patent Application WO 98/55942 and International Patent Application WO 98/55943 respectively.

WO 98/55942 discloses a video indexing system which analyzes contents of source video and develops a visual table of contents using selected images. The source video is analyzed to detect video cuts from one scene to another, and static scenes. Key frames are selected for each significant scene. A key frame filtering process filters out less desired frames including, for example, unicolor frames, or those frames having a same object as a primary focus or one of the primary focuses. A visual index is created from those frames remaining after the key frame filtering and stored for retrieval.

WO 98/55943 discloses a system for detecting significant scenes which detects video cuts from one scene to another, and static scenes based on DCT coefficients and macroblocks. A key frame filtering process filters out less desired frames including, for example, unicolor frames, or those frames having a same object as a primary focus or one primary focuses.

Other suitable techniques for automatically extracting key frames from a video stream are also known in the art and can easily be used in the invention. The key frames are temporally ordered, that is, if a first key frame occurs later in the collection than a second key frame, then the first key frame also occurs later in the image sequence than the second key frame.

Each key frame from said collection is associated with a portion of the representation 200. When the collection has been generated automatically, these portions correspond to the significant scene from which the respective key frames were extracted. If the collection was created manually, then it is also necessary to manually identify the portions to which the key frames belong.

In accordance with the invention, one of the frames from the collection is to be selected as a current key frame 212. Since the intent of this selection is to provide the user with visual feedback on the positioning of the slider 206, the selection should be related to a present position of the slider 206. As the slider 206 moves along the representation 200, it moves along portions of the representation 200 for which there are associated key frames in the collection. So, the current key frame 212 can be selected as a key frame whose associated portion comprises the present position of the slider 206.

The current key frame 212 is then displayed on the display 9. Preferably, the current key frame is displayed in a reduced size. By reducing the size of the current key frame 212 it is achieved that the user can still quickly identify the current location in the video stream, but his is not bothered with unnecessary detail. However, should he desire to see the full current key frame 212, he can in a preferred embodiment press a key of a remote control, such as the pause key. When the user command unit 10 receives this command, it generates a Pause action. In response to this Pause action, the current key frame 212 is displayed in a substantially full screen fashion. It may not be possible to display the current key frame 212 on the entire screen, since the representation and the slider may need to be kept on the screen 9 as well.

Now, presenting the current key frame 212 in this fashion thus provide a suitable amount of context, but sometimes it is desired to provide even more context. In such a case, a further key frame from the collection can be selected and displayed, which further key frame is adjacent in the collection to the current key frame 212. That is, the successor or predecessor in the collection to the current key frame is displayed.

In fact, an even greater amount of context can be obtained by presenting five frames: the current key frame 212, its predecessor 211, its successor 213, the predecessor 210 of the predecessor 211, and the successor 214 of the successor 213. By presenting five key frames in this fashion, a large amount of context is established, and the individual key frames 210–214 can still be displayed together with a sufficient amount of detail.

The choice of any further key frames to be presented in addition to the current key frame 212 need not be symmetric. Often, the user starts at the beginning of the video stream, and is looking for a scene which is located further along in the stream. In such a case, he needs more context in the forward direction than in the backward direction. Then, for example, three successors and one predecessor key frame may be shown in addition to the current key frame.

A further enhancement is achieved by displaying an indication of at least one key frame from the collection of key frames along the representation 200, at a location corresponding to the portion associated with the at least one key frame. In the embodiment shown in FIG. 2, all key frames from the collection are indicated using black boxes 205. It is immediately evident that in this case, the key frames in the collection are not distributed evenly along the representation 200. This means that also the portions in which the representation is divided are distributed unevenly along the representation 200. Without the indications 205, the display of the current key frame 212 would change at seemingly random moments while the slider 206 is moved along the representation 200. With the indications 205, the presentation of the current key frame 212 will change when the slider 206 approaches or passes one of the indications 205. This provides the user with visual feedback on what is happening.

When the collection of key frames comprises a large number of frames, it may not be practical to show indications 205 representing all key frames in the collection. For example, for a movie of 90 minutes (5400 seconds), and one key frame every 10 seconds, there would be over 500 key frames. That could mean one key frame per pixel of the representation 200 in horizontal direction. In such a case, the indications 205 could be shown only for a subset of the collection of key frames.

Preferably the selection of the current key frame 212 is made whenever the slider 206 is moved along a location of one of said indications 205. This provides a visual "trigger" to the user. In this embodiment a new current key frame 212 is now displayed whenever the slider 206 passes one of the indications 205. The same effect can be obtained by consistently positioning the indication 205 at the beginning of the portions with which they are associated.

When plural key frames 210–214 are presented together, moving the slider 206 across the portions in which the representation 200 is divided realizes that the user can browse through the key frames 210–214 in a scrolling fashion.

The relationship between the indications 205 and the key frames 210–214 being displayed could be visually enhanced by e.g. drawing a connector between an indication and the corresponding key frame, as shown in FIG. 2. This creates a "zoom" effect on the display 9. When a new current key frame 212 is selected the lines indicating the correspondences will move to other indications.

The system according to the invention can be embodied as a television receiver, a set-top box, a video recorder, or a computer, loaded with the appropriate software. The system can be realized by means of a computer program, which can be stored on a storage medium such as a floppy disk or CD rom, or made available over a network by a file server. The computer program will, when loaded into a programmable device, cause a processor in said device to execute the method according to the invention. Thus, the computer program enables a programmable device to function as the system according to the invention.

What is claimed is:

1. A method for selecting a position in an image sequence within a video stream, the method comprising the steps of: displaying a representation of the image sequence, providing a position indicator configured to be moved along the representation, and selecting the position in the image sequence in correspondence to a present position of the position indicator, characterized by obtaining a collection of key frames, each key frame being associated with a portion of the representation, selecting from the collection of key frames a current key frame whose associated portion comprises a present position of the position indicator, and displaying the current key frame and simultaneously displaying at least one additional key frame near the current key frame.

2. The method as claimed in claim 1, where the image sequence within the video stream is composed from data packets.

3. The method as claimed in claim 1, where the collection of key frames is obtained by automatically generating plural key frames from the video stream.

4. The method as claimed in claim 1, wherein displaying the at least one additional key frame further comprises a further key frame selected from the collection, and being adjacent in the collection to the current key frame.

5. The method as claimed in claim 1, wherein displaying the at least one additional key frame further comprises displaying a next key frame from the collection of key frames, being the successor to the current key frame in the collection of key frames, a previous key frame from the collection of key frames, being the predecessor to the current key frame in the collection of key frames, a further next key frame from the collection of key frames, being the successor to the next key frame in the collection of key frames, and a further previous key frame from the collection of key frames, being the predecessor to the previous key frame in the collection of key frames.

6. The method as claimed in claim 1, where the position indicator (206) is configured to be user-operably positioned along the representation (200).

7. The method as claimed in claim 1, further comprising displaying an indication (205) of at least one key frame from the collection of key frames along the representation (200) at a location corresponding to the portion associated with the at least one key frame.

8. The method as claimed in claim 7, whereby the selection of the current key frame (212) is made whenever the position indicator (206) is moved along a location of an indication (205) of a key frame from the collection of key frames.

9. The method as claimed in claim 1, further comprising displaying, in response to a Pause action, the current key frame (212) in a substantially fill-screen fashion.

10. A system for selecting a position in an image sequence, comprising browsing means for displaying a representation of the image sequence and a position indicator configured to be moved along the representation, and selecting means for selecting the position in the image sequence in correspondence to a present position of the position indicator, characterized by sequencing means for obtaining a collection of key frames, each key frame being associated with a portion of the representation, and current key frame selecting means for selecting from the collection of key frames a current key frame whose associated portion comprises a present position of the position indicator, the browsing means being arranged the further displaying the current key frame and simultaneously displaying at least one additional key frame near the current key frame.

11. The system as claimed in claim 10, arranged for upon a first occurrence of an increase speed action, displaying the image sequence at a display speed higher than a normal display speed, and upon a further occurrence of the increase speed action, activating the browsing means.

12. The system of claim 10, where the image sequence constitutes a video stream.

13. The s system of claim 12, where the collection of key frames is obtained by automatically generating plural key frames from the video stream.

14. The system of claim 10, Wherein displaying the at least one additional key frame further comprises a further key frame selected from the collection, and being adjacent in the collection to the current key frame.

15. The system of claim 10, where the present position indicator is configured to be user-operably positioned along the representation.

16. The system of claim 10, wherein the browsing means further includes displaying an indication of at least one key frame from the collection of key frames along the representation at a location corresponding to the portion associated with the at least one key frame.

17. The system of claim 16, whereby the selection of the current key frame is made whenever the position indicator is moved along a location of an indication of a key frame from the collection of key frames.

18. A computer program product contained on a medium that is readable by a programmable device that controls the programmable device to function as a system for selecting a position in an image sequence, comprising browsing means for displaying a representation of the image sequence and a position indicator configured to be moved along the representation, and selecting means for selecting the position in the image sequence in correspondence to a present position of the position indicator, characterized by sequencing means for obtaining a collection of key frames, each key frame being associated with a portion of the representation, and current key frame selecting means for selecting from the collection of key frames a current key frame whose associated portion comprises a present position of the position indicator, the browsing means being arranged for further displaying the current key frame and simultaneously displaying at least one additional key frame near the current key frame.

19. The computer program product as claimed in claim 18, wherein displaying the at least one additional key frame further comprises a further key frame selected from the collection, and being adjacent in the collection to the current key frame.

20. The computer program product as claimed in claim 18, wherein displaying the at least one additional key frame further comprises displaying a next key frame from the collection of key frames, being the successor to the current key frame in the collection of key frames, a previous key frame from the collection of key frames, being the predecessor to the currant key frame in the collection of key frames, a further next key frame from the collection of key frames, being the successor to the next key frame in the collection of key frames, and a further previous key frame from the collection of key frames, being the predecessor to the previous key frame in the collection of key frames.

* * * * *